United States Patent [19]

Hale et al.

[11] 4,048,368

[45] Sept. 13, 1977

[54] LAMINATED SUBSTRATE FOR AN OFFSET PRINTING BLANKET

[75] Inventors: Ferrell Daniel Hale, Langdale, Ala.; Charles H. Crowder, West Point, Ga.

[73] Assignee: West Point Pepperell, Inc., West Point, Ga.

[21] Appl. No.: 678,436

[22] Filed: Apr. 19, 1976

[51] Int. Cl.² .............................................. B32B 7/00
[52] U.S. Cl. .................................. 428/235; 428/229; 428/259; 428/909
[58] Field of Search ....................... 28/72.2 R; 428/234, 428/235, 247, 255, 259, 300, 301, 252, 282, 257, 258, 909; 156/148

[56] References Cited

U.S. PATENT DOCUMENTS

| | | | |
|---|---|---|---|
| 3,615,990 | 10/1971 | Butler | 28/72.2 |
| 3,704,191 | 11/1972 | Buresh et al. | 156/148 |
| 3,834,978 | 9/1974 | Nisenson | 28/72.2 |
| 3,839,136 | 10/1974 | Eriksson | 28/72.2 |
| 3,937,860 | 2/1976 | Gusman et al. | 156/148 |

Primary Examiner—James J. Bell
Attorney, Agent, or Firm—Cushman, Darby & Cushman

[57] ABSTRACT

A woven fabric including fibers of high strength and low elongation extending in the warp direction, is laminated to a non-woven mat which is saturated with a latex. The exposed surface of the resultant laminate is buffed to insure precise dimensional thickness.

3 Claims, 1 Drawing Figure

U.S. Patent     Sept. 13, 1977     4,048,368
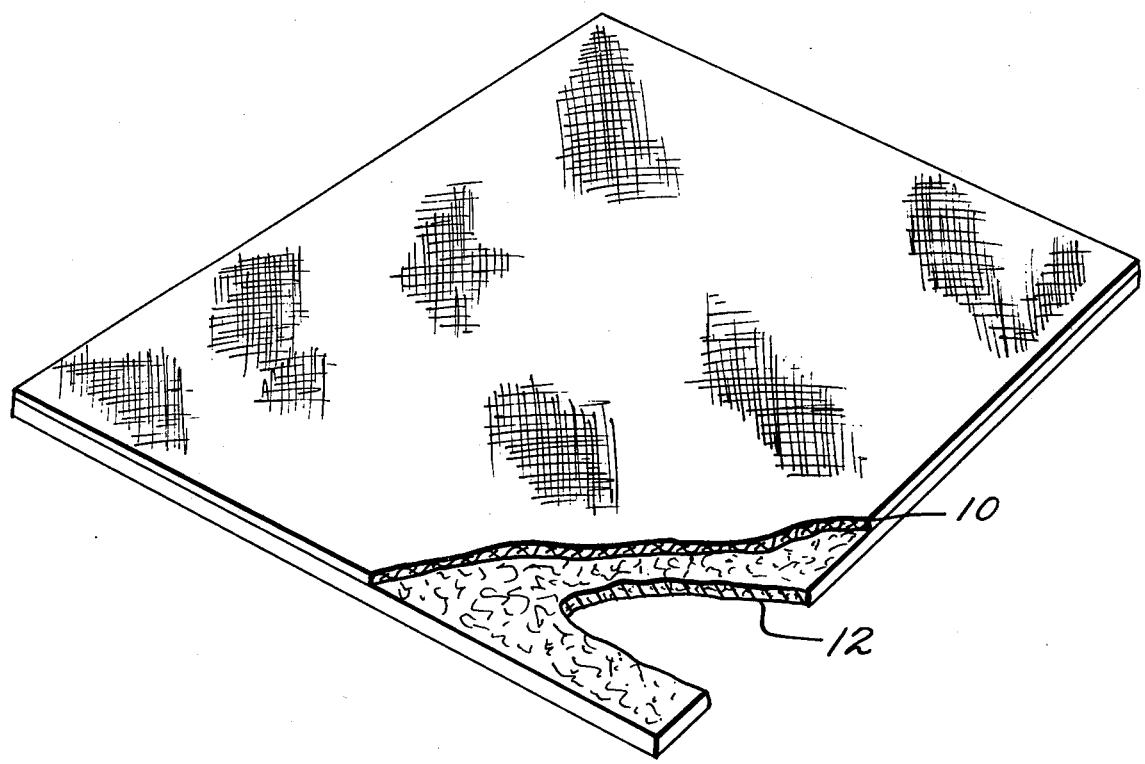

LAMINATED SUBSTRATE FOR AN OFFSET PRINTING BLANKET

BACKGROUND OF THE INVENTION

The present invention relates to an improved substrate for use in the fabrication of an offset printing blanket.

In order to have a satisfactory offset printing blanket so that accurate printing can be achieved, it is necessary that the blanket which carries the material for printing be strong, compressible, low in stretch and have constant thickness and smoothness. Absent these properties, the copy material as it proceeds through the printing operation is non-uniformly subjected to the printing process, causing a less than satisfactory product to result.

Present efforts to produce a quality offset printing blanket include forming a laminated blanket substrate by alternating several layers of fabric and rubber. Such a procedure is expensive, and substrates of this type can permanently set and wrinkle when several pieces of copy paper simultaneously pass through the printing press.

The present invention provides a substrate of uniform thickness having the desired strength, stretch and compressibility characteristics necessary for accurate offset printing. Such a substrate can be produced in a much simpler manner than multiple layer laminations of the type just described.

SUMMARY OF THE INVENTION

The improved substrate for an offset printing blanket according to the present invention comprises a woven fabric to which a non-woven mat is laminated. The woven fabric is formed with a warp of high strength, low elongation material and a fill of polyester, cotton or other material. The non-woven comprises a needle-punched mat saturated with a latex. The woven fabric is stretched to remove as much elongation as possible and is stabilized in the stretched condition. The fabric and the non-woven mat then are laminated with an adhesive interposed between the two, and the resultant laminate is buffed on the exposed surface of the non-woven material to properly dimension it. Utilizing a substrate of the type just outlined, the printing blanket is completed in a conventional manner. More particularly, multiple thin layers of rubber are sequentially applied to the buffed surface of the laminate. The rubber is then cured by vulcanization.

Details of the invention will become more apparent from the following description of a preferred embodiment of the invention which is described with reference to the accompanying drawing which represents a perspective view, partially in section, of a woven fabric and a non-woven mat combined as a laminated substrate for an offset printing blanket.

DETAILED DESCRIPTION OF THE INVENTION

Referring to the FIGURE, the woven fabric is indicated by the numeral 10. The fabric in the warp direction comprises spun fibers having high strength and low elongation, while the fill is formed fibers of polyester or other synthetics, cotton, or from blends thereof. Preferably, the fabric 10 is woven as a satin weave resulting in the warp fibers being raised on one surface of the fabric, while the fill fibers are raised on the opposite surface.

The warp fiber preferably is an aromatic polyamide. Representative materials suitable for practicing the invention are those disclosed, for example, in U.S. Pat. No. 3,850,888— Fitzgerald et al and in U.S. Pat. Nos. 3,869,429 and 3,869,430— both to Blades. Filaments made from such materials are characterized as having high tensile strength at least in the order of four times that of a comparable cotton fiber. They are very inert chemically and are affected only slightly up to temperatures of 200° C.

After fabric 10 is woven, it is stretched to remove as much elongation as possible. The material is locked or stabilized in its stretched position. Among the materials suitable for stabilizing the fabric are: acrylic latices (including those of the self-curing type), nitrile or other latices, latices combined with a thermosetting resin, polyvinyl alcohol (with or without a thermosetting resin), and polyvinyl alcohol with an insolubilizing agent such as borax. Also included are modifiers, e.g., diethylene glycol as a humectant and starch stabilizer. Other modifiers may be used as needed for specific purposes. After application of the stabilizer, the fabric is dried and cured as necessary. Thereafter, the fabric preferably is calendared to provide more uniform gauge and a smoother surface for a subsequent lamination process.

The non-woven mat 12 is formed by preparing a web of fibers, preferably made from polyester. In order to impart cohesiveness and limited strength to the non-woven mat, it is needle-punched. Thereafter, the mat is saturated by a latex solution and is then dried. Preferably, the saturating latex is a butadiene-acrylonitrile copolymer, and the amount of saturation is such that the dried mat 12 contains about 67% latex binder and 33% polyester fiber.

At this point, if desired, the non-woven mat may be split to halve its thickness dimension.

The fabric 10 and the non-woven mat 12 are laminated by arranging the fabric so that the side containing the raised fill fibers faces the mat. If the mat has been split, the surface exposed as a result of the splitting operation faces the fabric. A thickened butadiene-acrylonitrile latex adhesive is applied to the woven fabric, the mat and fabric are pressed together, and the adhesive is dried.

While the adhesive and binder have been described as a butadiene-acrylonitrile latex, other types of latices are possible depending upon the type of rubber to be applied to the laminated substrate to complete the printing blanket. For example, neoprene rubber would require a neoprene latex, while a natural or styrene butadiene rubber would require a styrene butadiene latex.

The substrate is completed by buffing the exposed surface of the non-woven material 12 to precisely dimension the thickness of the laminate. This buffing is preferably done with sandpaper. Typically such an operation produces a substrate having a smooth surface and a uniform thickness of 55 ± 1 mils.

In order to complete a printing blanket using the foregoing substrate, it is only necessary to apply the rubber coating in the conventional manner previously described.

The laminated substrate just described has the desirable properties of substantial strength and minimum elongation due to the composition of the woven fabric 10, while the non-woven mat 12 contributes significantly to the substrate's compressibility, smoothness and controlled dimensions.

What is claimed is:

1. A substrate for an offset printing blanket comprising:
 a woven fabric including spun warp fibers formed from an aromatic polyamide and fill fibers made of polyester, said warp fibers having a tensile stength at least in the order of four times that of cotton; and a needle-punched non-woven mat laminated to said woven fabric by an adhesive.

2. A substrate as set forth in claim 1, wherein said fabric further includes a stabilizer applied to the fabric with the warp fibers in a stretched position.

3. A substrate as set forth in claim 2 wherein said non-woven mat is saturated by a latex binder.